United States Patent [19]

Nelson et al.

[11] 4,392,179
[45] Jul. 5, 1983

[54] APPARATUS AND METHOD FOR SEPARATING ADHERING MEDIA ELECTROSTATICALLY

[75] Inventors: Alfred M. Nelson, Redondo Beach, Calif.; Houshang Rasekhi, Convent Station, N.J.

[73] Assignee: Wang Laboratories, Inc., Lowell, Mass.

[21] Appl. No.: 281,747

[22] Filed: Jul. 9, 1981

[51] Int. Cl.³ .......................................... H01F 13/00
[52] U.S. Cl. .................................. 361/234; 361/144; 355/3 CH
[58] Field of Search ............... 361/233, 234, 143, 144; 346/153.1; 355/3 CH, 3 TR, 14 CH

[56] References Cited
U.S. PATENT DOCUMENTS 3,647,292  3/1972  Weikel et al. ...................... 355/3 R
3,783,344  1/1974  Ono et al. ............................ 361/144
4,217,819  8/1980  Von Tluck et al. ............... 355/3 TR Primary Examiner—Reinhard J. Eisenzopf
Attorney, Agent, or Firm—Michael H. Shanahan; Joseph E. Funk

[57] ABSTRACT

An apparatus and method are disclosed for electrostatically separating a first medium such as a magnetic tape from a second medium such as paper following transfer of images from the tape to the paper. The apparatus includes a movable member or platen disposed for moving the tape into contact with and away from the paper, and a voltage source coupled across predetermined portions of the tape and platen. The method includes the step of creating an electrostatic force between the tape and platen sufficient to overcome adherence of the tape to the paper during contact of the tape with the paper, facilitating separation of the tape from the paper as the platen is moved away from the paper following image transfer. Separation is accomplished substantially independent of tape tension. This permits operation with significantly less tape tension which, in turn, preserves tape integrity and provides for reduced tape breakage and misregistration of tape with paper, more effective cleaning of the tape, and less wear of the tape and the tape cleaning devices.

11 Claims, 6 Drawing Figures

APPARATUS AND METHOD FOR SEPARATING ADHERING MEDIA ELECTROSTATICALLY

REFERENCE TO RELATED APPLICATIONS

This application relates to prior U.S. patent application Ser. No. 228,526 filed Jan. 26, 1981, and Ser. No. 268,595, filed May 29, 1981, the subject matter of which prior applications, insofar as it is pertinent to the present invention, is incorporated herein by reference.

BACKGROUND AND SUMMARY OF THE INVENTION

The present invention relates to separation of a magnetic medium or web from a substrate or paper by electrostatic means without adversely affecting information recorded on the magnetic medium or the paper.

In systems where respective segments of a magnetic tape are brought into contact with and are moved away from a sheet of paper by means of a movable member, there is a tendency for a segment of the tape to adhere to the paper for an undesirable length of time, often despite the method used to hold the paper in place. Generally, in xerographic recording systems, the substrate such as plain paper is held in place on a drum or flat bed by means of a constantly applied electrostatic force. In other image recording systems, the paper may be held in place by a vacuum or clamp means, the latter tending to impart a tension to the paper.

Thus, regardless of the method used to hold the substrate or paper in place, there is a distinct need to be able to effect separation of the tape segment from the paper a selected short period of time after contact of the tape segment with the paper and completion of transfer of images from the tape segment to the paper. This should be done without adversely affecting information recorded on the tape or the paper.

Accordingly, as reflected in the illustrated preferred embodiment of the present invention, an apparatus and method are provided for effecting said separation within a selected predetermined short period of time, without adversely affecting information recorded on the tape or paper. The apparatus comprises a movable member or platen constructed to form, together with the tape, a capacitive element, and a voltage source for providing a voltage drop across the capacitive element. The platen is disposed for moving the tape into contact with and away from the paper, the tape having an electrically-conductive layer and a magnetizable image layer disposed for engaging the paper, and the platen having an electrically conductive layer and an electrically insulative layer disposed for electrically insulating the conductive layers of the platen and tape from each other. The voltage source is coupled to provide a voltage drop across (difference of potential between) the conductive layers for a selected period of time. This causes an electrostatic force to exist between the conductors sufficient to overcome adherence of the tape to the paper, facilitating separation of tape from paper during the selected period of time as the platen is moved away from the paper. Separation is accomplished substantially independent of tape tension. This permits operation with significantly less tape tension which, in turn, preserves tape integrity and provides for reduced tape breakage and misregistration of tape with paper, more effective cleaning of the tape, and less wear of the tape and the tape cleaning devices.

BRIEF DESCRIPTION OF THE DRAWINGS

The invention and its method of operation should become better understood with reference to the following detailed description taken in conjunction with the accompanying drawings, in which.

DESCRIPTION OF THE PREFERRED EMBODIMENT

Figure 1:
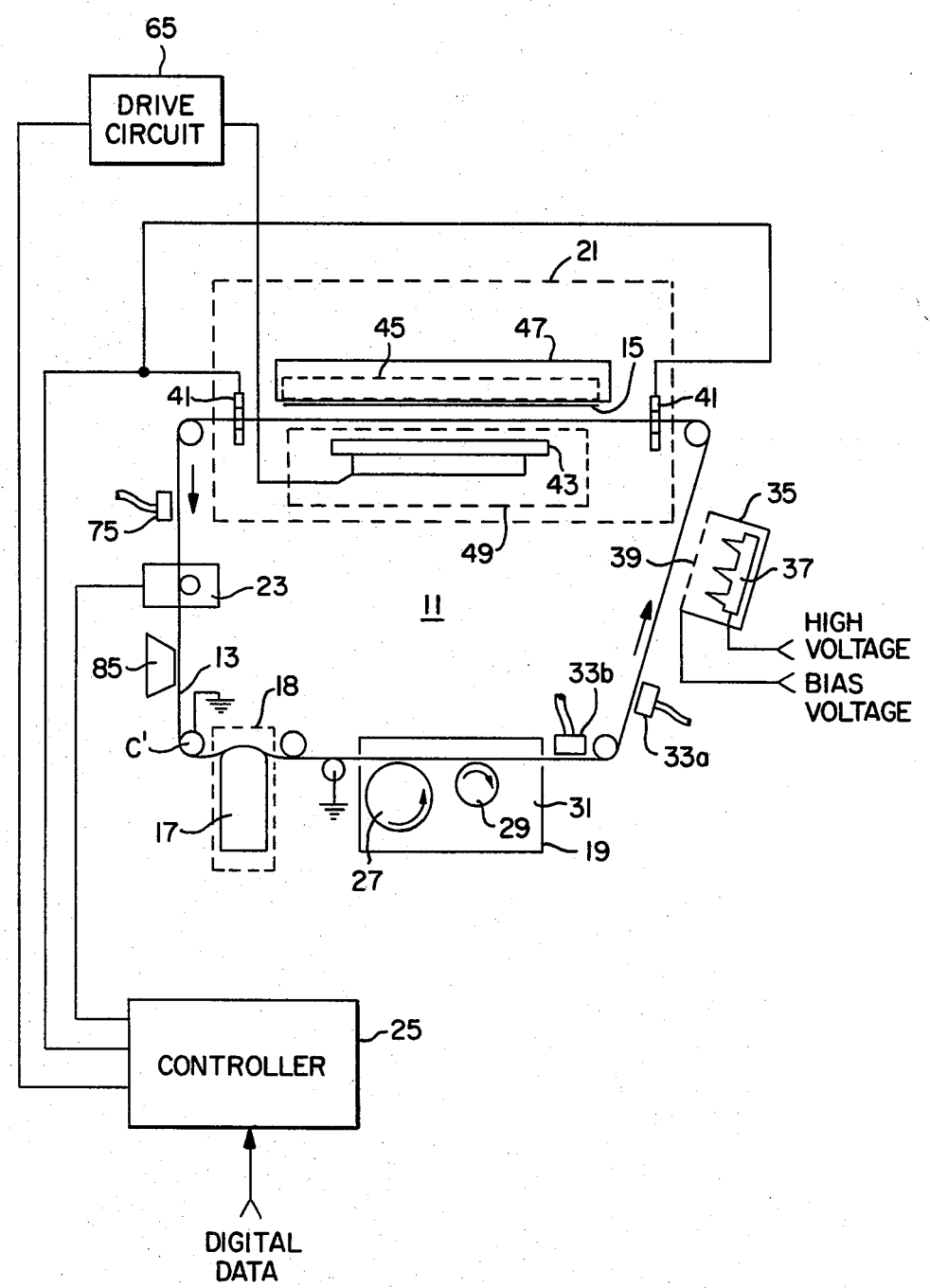
FIG. 1 is a combined schematic and block diagram of a system incorporating the present invention.

Referring now to FIG. 1, there is shown a magnetographic printing apparatus or system 11 responsive, for example, to applied digital data, for recording data images on an endless magnetizable medium or web such as a magnetic tape or band 13, for toning or developing the image, and for transferring the toned image to paper 15 to produce high quality printed output at relatively high-speed operation. The magnetizeable medium 13 includes at least one electrically conductive layer, which may be constructed in accordance with the teachings of U.S. patent application, Ser. No. 268,595, filed May 29, 1981. The apparatus includes a magnetic recording head 17 for creating a magnetic latent image on tape 13, a developer station 19 for developing the latent image by applying toner (dry magnetically attractable ink particles contained in the developer station) to the latent image, and a transfer station 21 for transferring toner from the developed image to paper 15 or some other medium. The latent image creation and development operations may be performed in much the same manner as described in U.S. Pat. No. 4,110,758 issued to Nelson, et al.

As shown in FIG. 1, tape 13 is operatively coupled to a shaft of motor 23 and is advanced by the motor as a closed loop through the various stations of the system. As the tape 13 passes recording station 18, recording head 17 records a magnetic latent image onto the tape. The tape is then advanced to developer station 19 where toner applicator brush or drum 27 develops the latent image by applying magnetic toner particles to the tape. The magnetized latent image areas on the tape attract the toner, thereby developing (toning) these image areas. Excess toner is removed from the tape by a scavenger drum 29 and returned to toner reservoir 31. As a further aid in cleaning the tape (i.e., removing unwanted toner from the tape), a first vacuum outlet 33 coupled to a vacuum source (not shown) provides a suction of air across the image (front) surface of the tape to remove background toner particles not tightly bound by the magnetic forces exerted by the image areas.

Following developing and cleaning, the toner particles remaining on the tape are charged by a corotron or scorotron 35. The scorotron provides an ionizing source 37 and a bias screen 39 proximate to the tape surface to charge the toner particles on the tape prior to transfer of the toner to the paper. The screen 39 of the scorotron 35 is maintained at a constant potential to ensure that the toner receives a uniform charge.

After the recorded latent image is developed, the tape is cleaned, and the toner particles on the image areas are charged, the tape 13 is advanced to transfer station 21. In the example of the embodiment here depicted, the tape 13 is comprised of a predetermined number (e.g., three) of longitudinal segments for recording latent images.

A hole (not shown) is formed through the tape preceding each such segment, a segment representing a length of tape used to print a line of characters (symbols). It will be appreciated that tape 13 could provide two or more lines of characters simultaneously to the transfer station. As a tape segment is moved into position in transfer station 21, light from a light source of photosensor arrangement 41 passes through the hole and is detected by a detector of photosensor 41. In response to the detection of the hole, photosensor arrangement 41 applies a signal to controller 25 which brakes and stops the motor 23 (e.g., by applying a reverse polarity signal, then no signal to the motor) to position the tape segment within transfer station 21 in preparation for image transfer.

Figure 2:
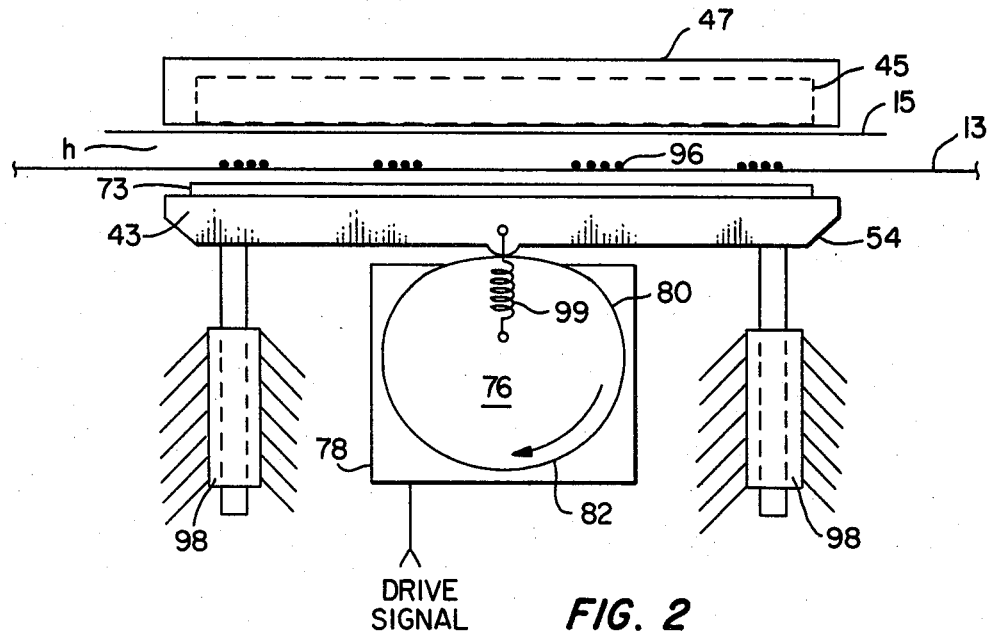
FIG. 2 is a cross-sectional side or end view of an apparatus usable in the system of FIG. 1 for imparting movement to a platen.
Figure 3:
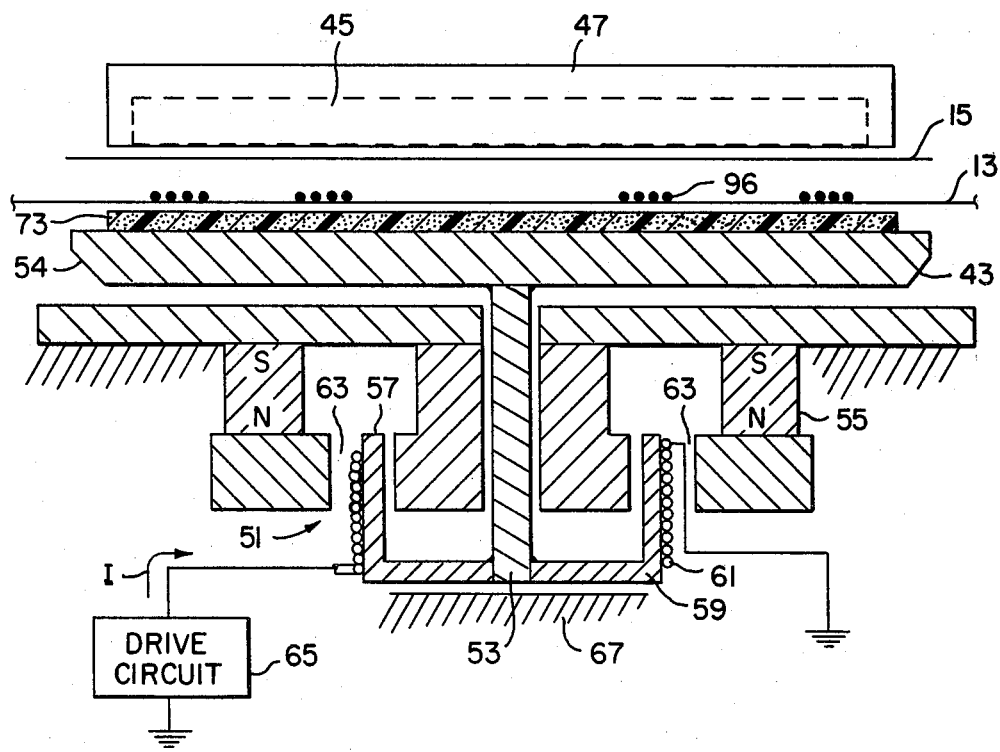
FIG. 3 is a cross-sectional side or end view of an alternative apparatus usable in the system of FIG. 1 for imparting movement to a platen.

With the tape segment having the toned image positioned thus for transfer, a movable platen 43 of a tape positioner 49 is then actuated from the controller 25 via drive circuit 65 to press the tape segment with its toned image into gentle contact with the paper 15. A transfer voltage (pulse) is then applied to electrode 45 contained in an insulated cavity in hollowed vacuum back plate 47 located adjacent to and above paper 15 which creates an electrostatic force attracting the toner (the toned image) to the paper during the transfer period. While electrode 45 is shown in FIGS. 2 and 3 somewhat apart from paper 15 for ease of illustration, the electrode is, in fact, in contact with the paper during transfer. Following image transfer, platen 43 is returned to an open (non-contact) position.

The tape is then advanced by motor 23 as governed by controller 25 such that the tape segment corresponding to the transferred developed image passes by a second vacuum outlet 75 which removes any residual toner particles from the tape's surface. Thereafter, the tape segment advances to a station 85 where the imaged portions are magnetically reoriented, thus preparing the tape segment for the next imaging operation.

FIG. 2 shows a preferred embodiment of the transfer station 21. The segment of tape 13 carrying an imaged line of text is shown in position between the paper 15 and platen portion 43 of the transfer station 21. Platen 43 includes a horizontal portion 54 bearing a resilient covering 73 on its operative face. Situated behind the paper 15 is the transfer electrode 45 as contained in an insulated cavity (not particularly shown) in the hollowed vacuum backplate 47. The paper 15 is maintained uniformly on the flat lower surface of backplate 47 by the presence of a controlled negative pressure thereon which communicates with the paper via a suitable arrangement of apertures (not shown) in the backplate's lower surface. As illustrated, an initial gap h (exaggerated for ease of understanding) exists between the tape medium 13 and the paper 15.

Platen 43 is mounted upon a pair of rods housed in respective relatively long bearings 98 suitably affixed to the frame (not particularly shown) of the system. Movement of platen 43 is governed by a drive arrangement 78 which comprises a cam 76 having cam surfaces 80 and 82 in contact with the lower surface of platen 43. Cam 76 is secured to platen 43 via a spring 99, and the cam drive shaft is securely maintained in position relative to the system's frame.

In operation, a drive signal is input to arrangement 78 (FIG. 2) which actuates and governs continuous rotation of the cam whereby the cam surfaces 80 and 82 thereof urge platen 43 upward at an instantaneously varying velocity such that the tape 13 controllably approaches the paper 15 situated on the lower surface of backplate 47, in accordance with the invention. Alternatively, arrangement 78 could comprise an eccentrically mounted cam having a less complex operating surface, which is driven by a stepping motor fed by an input control or drive signal of varying frequency corresponding to a selected velocity profile. Design of a cam in accordance with the velocity profile may be made according to known methods reflected in the text "Cams" by H. Rothbart published by Wiley & Sons, New York, U.S.

In another alternative arrangement (not particularly shown), unit 78 could be replaced by a spring-loaded bellows arrangement suitably coupled to a hydraulic system terminating in a cam-driven second bellows arrangement, the cam being contoured or configured so as to provide movement of the platen in accordance with a selected velocity profile. In this way, substantially all of the mechanical apparatus associated with the platen may be housed remotely from the transfer station, without sacrificing operation efficiency.

FIG. 3 shows another embodiment of the transfer station 21. Tape positioner 47 (FIG. 1) comprises, as before, movable platen 43, and in this embodiment a vertically movable coil actuator 51. Platen 43 includes a vertical portion 53 and a horizontal or bar portion 54. Vertical portion 53 serves to rigidly couple bar portion 54 to actuator 51. Actuator 51, in turn, includes a ring-shaped permanent magnet 55 and an armature 57. The armature 57 comprises a cylindrically shaped member 59 (illustrated in cross-section in FIG. 3) about which is wound a predetermined number of turns of conductor 61. Armature 57 and the vertical portion 53 of platen 43 are positioned for vertical motion within air gap 63 of ring magnet 55. Member 59 is constructed preferably of aluminum, which serves to damp the movement of the actuator to eliminate jitter.

In response to a drive current signal applied by drive circuit 65 to armature 57 of actuator 51, a force proportional to the current in the conductor 61 in the magnetic field provided by ring magnet 55 serves to move platen 43, and in particular the horizontal bar 54, to bring the tape 13 rapidly into contact with the paper 15. Separation thereafter is achieved through the combination of the drive current and gravity.

When tape 13 is moved into contact with paper 15, whether by means of a cam-driven or an actuator-driven platen 43 as shown in FIGS. 2 and 3, it has been found that there is a tendency for the tape to remain in contact with the paper for an undesirable amount of time during the period that platen 43 is being moved away from the paper after toner transfer. To reduce this undesirable amount of time and facilitate separation of tape from paper following transfer, the following methods were considered. First, a vacuum system, capable of applying a negative force through movable platen 43 binding the tape to the platen after each transfer period, has been considered and found to be too complex. Likewise, clamping each tape segment to platen 43 prior to transfer and unclamping the segment after toner transfer has been found to be practically unworkable. Furthermore, tension produced in the tape by the clamping caused the tape segments to become slightly stretched resulting in misalignment of consecutive lines of print.

Figure 4:
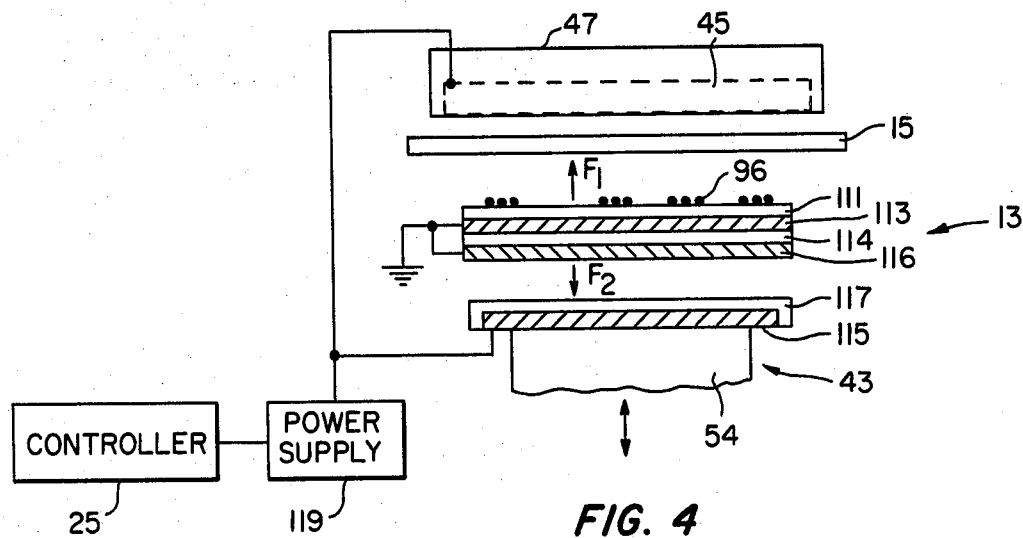
FIG. 4 is a combined schematic and block diagram showing an apparatus of the present invention.

The use of a constantly applied voltage between the tape 13 and movable platen 43 to hold the tape to the platen was also investigated. It was found that after several image transfer (toner transfer) operations, the separation time (i.e., the time taken for the tape to separate from the paper after movement of platen 43 away from the paper after image transfer) was not appreciably reduced despite the use of the constantly applied voltage. Also, the use of high constantly applied voltages caused the tape to adhere to the platen for undesirable periods of time. Further investigation was then undertaken. This further investigation resulted in the discovery of a magnetic tape and platen configuration as shown in FIG. 4. As illustrated therein, a switchable electrostatic force is provided which is applicable between the tape and platen and is sufficient to facilitate separation of tape from paper, yet does not adversely affect information recorded on the tape or paper, and yet avoids the drawback of the tape sticking to the platen after separation of tape from paper has been accomplished.

FIG. 4 shows tape 13 in cross-section having a laminated structure comprising a somewhat conductive (e.g. a relaxation time of around one millisecond) magnetizable layer 111, a conductive layer 113, a Mylar layer 114 and a conductive back layer 116. The magnetizable layer may be formed from any suitable magnetizable material such as $C_rO_2$ or $Fe_2O_3$, while the conductive layer 113 may be formed from materials such as aluminized Mylar having low resistivity (e.g., resistivity $<10^4$ ohms per square). Layer 113 is electrically grounded so as to provide a continuous circuit path to ground, and to dissipate any charges that may accumulate on the tape. It should be noted that a so-called metallized tape, i.e. essentially a two-layer tape in which the substrate is metallic and the other layer is magnetizable, could also be utilized in connection with this invention.

Movable platen 43 comprises horizontal bar portion or transfer bar 54, a flexible conductive layer 115 superimposed on transfer bar 54, and a flexible insulative surface layer 117 disposed to cover the top surface and side edges of layer 115. Insulative layer 117 thus serves to ensure the insulation of conductive layer 116 from conductive layer 115 when platen 43 engages tape 13. Layer 115 may be comprised of any suitable material such as conductive rubber with a resistivity generally below $10^4$ ohms per square. Layer 117 may be any flexible dielectric material such as TEDLAR ® with a dielectric constant generally above three.

As shown in FIG. 4, a power supply or voltage source 119, with one terminal coupled to ground and its other terminal coupled to electrode 45 and to conductive layer 115, provides a high potential difference (e.g., a +600 volt potential difference) between conductive layers 115 and 116 on the one hand, and electrode 45 and conductive layer 113 on the other hand. This potential between the aforesaid conductive layers is provided by the power supply in response to a signal from controller 25. The conductive layers 115 and 116 act as plates of a capacitor, and insulative layer 117 acts as a dielectric between the plates. When a potential is applied across the conductive layers, an electrostatic force is created therebetween which attracts the conductive layers to each other, thereby effecting adherence of tape 13 to platen 43.

Thus, by applying a potential across the conductive layers 115 and 116 for a selected period of time (e.g., forty milliseconds) while platen 43 begins its movement and is being moved away from paper 15, tape 13 becomes attracted to platen 43 and moves with the platen away from the paper facilitating separation of the tape from the paper 15. The electrostatic force of attraction ($F_2$) between the conductors 115 and 116, and hence between tape 13 and platen 43, may be expressed as:

$$F_2 = \frac{C_2 V_2^2}{2d_2} \quad (1)$$

where, $F_2$ represents the attraction force (in newtons) between conductors 115 and 116, $C_2$ represents the capacitance (in farads) of a capacitor comprising conductive layers 115, 116 and insulative layer 117 acting collectively, $V_2$ represents the voltage applied across conductive layers 115 and 116, and $d_2$ represents the distance (in meters) between the conductive layers 115 and 116, which distance is equivalent to the thickness of insulative layer 117 when tape 13 is in contact with platen 43.

As indicated below and as shown in FIG. 4, to enable tape 13 to separate from paper 15 and follow platen 43 away from the paper 15, force $F_2$ is maintained at a level greater than $F_1$ (i.e., $(F_1/F_2)<1$). Force $F_1$ between transfer electrode 45 and layer 113 may be expressed as:

$$F_1 = \frac{C_1 V_1^2}{2d_1} \quad (2)$$

where $C_1$ represents the capacitance (in farads) of a capacitor comprising electrode 45 and magnetizable layer 111 separated by insulative paper 15.

$V_1$ represents the voltage (in volts) applied across electrode 45 and conductive layer 113, and $d_1$ represents the distance (in meters) between electrode 45 and somewhat conductive layer 111, which distance is equivalent to the thicknesses of the paper 15 when tape 13 is pressed into contact with the paper 15. Upon substituting ($K_1 E_o A_1/d_1$) for $C_1$ in equation (2) and ($K_2 E_o A_2/d_2$) for $C_2$ in equation (1), F1 and F2 may be expressed as:

$$F_1 = \frac{K_1 E_o A_1 V_1^2}{2d_1^2} \quad (3)$$

$$F_2 = \frac{K_2 E_o A_2 V_2^2}{2d_2^2} \quad (4)$$

where $K_1$ represents ($E_1/E_0$), $E_0$ being the permitivity of free space (unpolarized air) equivalent to $8.854 \times 10^{-12}$ farads/meter, and $E_1$ being the resultant permittivity of paper 15, $K_2$ represents ($E_2/E_o$), $E_2$ being the resultant permittivity of insulative layer 117, $A_1$ represents a surface area corresponding to the surface area of electrode 45 disposed for contact with paper 15, and $A_2$ represents the surface area of conductive layer 115.

Upon selecting paper 15, layer 111 of tape 13 and layer 117 of platen 43 such that $K_1 \approx K_2$, $A_1 \approx A_2$, and selecting $V_1 = V_2$ (e.g., using power source 119 as shown in FIG. 4), it can be seen that $F_2 > F_1$ as long as $d_2$ is maintained less than $d_1$. This relationship also holds for $K_2 d_1^2 > K_1 d_2^2$ or for $K_2 d_1^2 A_2 V_2^2 > K_1 d_2^2 A_1 V_2^2$. By way of example, paper 15 may be selected having a thickness of three mils and insulative layer 117 may be selected having a thickness of one mil such that $d_2$ becomes equal to one mil and less than $d_1$ when paper 15 and tape 13 are sandwiched between electrode 45 and platen 43.

Figure 5:
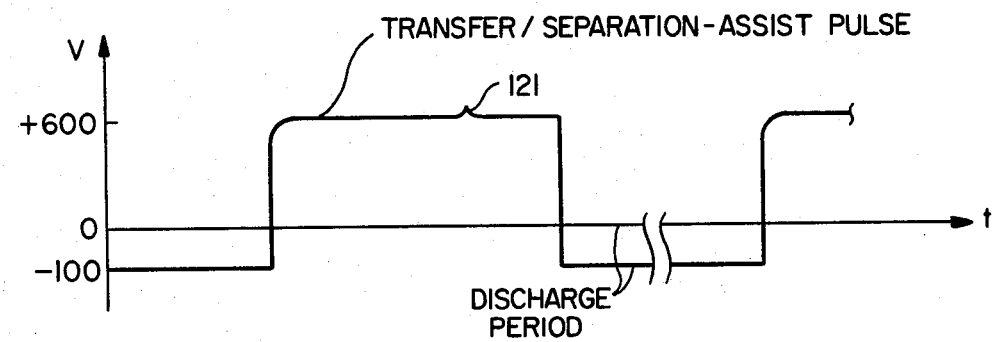
FIG. 5 is a waveform diagram showing specific periods of activation of the apparatus of FIG. 4.

FIG. 5 shows a waveform of, for example, a +600 volt transfer pulse applied to electrode 45 and to conductive layer 115. An inflection 121 in the waveform is shown to occur at about thirty-two to thirty-seven milliseconds after the initiation of the transfer pulse. This time corresponds to the beginning of the separation motion for a particular cam (FIG. 2). The inflection is due to a decrease in capacitance between electrode 45 and tape 13; the decrease in capacitance being occasioned by commencement of the separation of the tape 13 from the paper 15, and the increasing distance $d_1$ between the tape and paper. The decrease in capacitance causes the voltage to increase across electrode 45 and tape 13 until the charges on these two conductors become dissipated. The +600 volt transfer pulse is applied to electrode 45 and to conductive layer 115 during a portion (a selected period) of the time that the tape segment is positioned in transfer station 21 (FIG. 1) for image transfer. As shown in FIG. 5, the transfer pulse is not applied constantly to electrode 45 and to conductive layer 115, but is reversed to zero or, for example, to a −100 volt level after each +600 volt application, the zero or −100 volts level being sufficient to (1) dissipate any charges that may have accumulated on the insulative layer 117 during repeated application of the +600 volt transfer voltage and (2) prevent continued adherence of the tape to the platen at a time when a next segment of the tape is ready to be moved into the transfer station 21. The zero or −100 volts level may be applied during any selected period after completion of the application of the +600 volt pulse while tape 13 is in contact with platen 43 and before movement of the tape to position a subsequent segment for image transfer. The separation-assist pulse applied between layers 115 and 116 preferably is the same magnitude and polarity as the transfer pulse applied between electrode 45 and layer 113 as shown in FIG. 4; it may, however, be different in magnitude from the transfer pulse, and could be different in polarity as well. Also the separation-assist pulse preferably is applied simultaneously with the transfer pulse, as shown in FIG. 5; it may however be applied over a time period which is different from that of the transfer pulse.

It is important to note that in the above-mentioned simultaneous operation, both the separation-assist pulse and the transfer pulse are applied to the same element, namely the tape. Also, the transfer pulse should be present at least as long as the separation-assist pulse exists. Moreover, it is to be understood that the applied voltage(s) for the separation-assist and transfer functions can be reversed in polarity for given systems. For example, a −600 volt transfer pulse and a +100 volt discharge pulse may be used.

Figure 6:
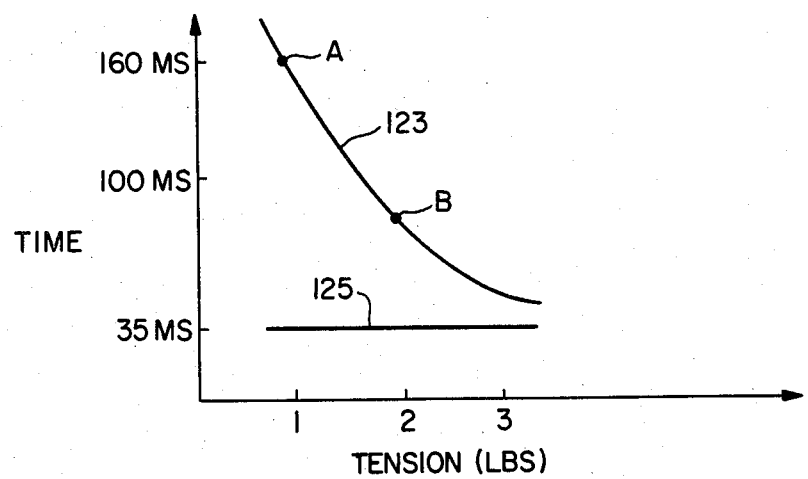
FIG. 6 is a waveform diagram showing specific effects of activation of the apparatus of FIG. 4.

When no voltage is applied to layer 115, the time taken for the tape to separate from the paper generally decreases as tension applied to the tape increases, as shown by curve 123 in FIG. 6. For example, as shown by points A and B in FIG. 6, when a tensile force of one pound is applied to the tape it has been found that it takes approximately 160 milliseconds for tape 13 to separate from paper 15, and approximately 75 milliseconds when a tensile force of two pounds is used. On the other hand, as shown by curve 125, when an apparatus such as that of FIG. 4 is used, tape 13 has been found to take approximately thirty-five milliseconds to separate from paper 15 substantially irrespective of tape tension, which time is solely attributable to the beginning of downward travel for a particular cam (FIG. 2). Thus, it can be said that when an apparatus such as that shown in FIG. 4 is used and a voltage is applied to layer 115, separation time becomes substantially unaffected by tape tension. This encourages reduction in tape tension, with attendant improvement in tape cleaning and tape wear factors, and lessened incidences of tape breakage, misregistration of tape with paper, and wear of tape cleaning devices.

We claim:

1. Apparatus for facilitating separation of a first medium from a second medium, the first medium being separably disposed proximate to the second medium, the apparatus comprising:
    a member having an electrically conductive first layer and an electrically insulative layer;
    the first medium having an image layer disposed for contact with the second medium and an electrically conductive second layer disposed for contact with the insulative layer, the insulative layer being a dielectric positioned between the first and second conductive layers; and
    a voltage source coupled to provide a predetermined potential difference between said conductive first and second layers creating an electrostatic force therebetween, attracting the first medium to the member and away from the second medium for a selected period of time.

2. The apparatus of claim 1 wherein the conductive second layer is electrically grounded, and the conductive first layer is coupled to receive a first selected voltage signal from the voltage source of sufficient magnitude to cause the first medium to adhere to the member during the selected period of time.

3. The apparatus of claim 2 wherein the conductive first layer is coupled to also receive a second selected voltage signal for terminating continued adherence of the first medium to the member after the selected period of time.

4. The apparatus of claim 3 wherein the second selected voltage signal is opposite in polarity to the first selected voltage signal.

5. The apparatus as in claim 4 wherein the second voltage signal is selected to effectively dissipate charges from the insulative layer.

6. The apparatus of claim 5 wherein the first medium is a magnetic tape having a magnetizable image layer and the second medium is paper.

7. Apparatus for effecting movement of a first medium with a movable member away from a second medium disposed contiguous to the first medium, the apparatus comprising:

an electrically conductive material disposed between the movable member and the first medium;

an electrically insulative material disposed between the electrically conductive material and the first medium to electrically insulate the conductive material from the first medium, the first medium having a first layer disposed for contact with the second medium and a second layer disposed for contact with the electrically insulative material, said second layer also being electrically conductive; and a voltage source coupled to provide a predetermined potential difference between the electrically conductive material and the second layer for a selected period of time, creating an electrostatic force between the conductors sufficient to overcome adherence of the first medium to the second medium and effect adherence of the first medium to the member whereby as the member is moved away from the second medium the first medium travels with the member for the selected period of time, thereby facilitating separation of the first medium from the second medium.

8. Apparatus for facilitating separation of a first medium from a second medium, the first medium being disposed proximate to and separably from the second medium and having images thereon for transfer to the second medium by a transfer means, the apparatus comprising:

a member having an electrically conductive first layer and an electrically insulative layer;

the first medium having a layer with the images thereon disposed for contact with the second medium and an electrically conductive second layer disposed for contact with the insulative layer, the insulative layer operating as a dielectric between the conductive first and second layers, and the second medium operating as a dielectric between the first medium and the transfer means; and at least one voltage source coupled to provide a predetermined first potential difference between the transfer means and the conductive second layer creating a first electrostatic force therebetween for transferring the images from the first medium to the second medium, and coupled to provide a predetermined second potential difference between the conductive first and second layers creating a second electrostatic force therebetween for attracting the first medium to the member and away from the second medium for a selected period of time substantially without adversely affecting the transferred images.

9. The apparatus as in claim 8 wherein the predetermined first and second potential differences are created substantially simultaneously.

10. The apparatus as in claim 9 wherein the voltage source is a single voltage source and the first and second predetermined potential differences are substantially the same.

11. A method of causing a first medium having a conductive layer and an image layer and on the image layer images are created and developed with toner to adhere to a movable platen having a conductive layer as the platen moves the first medium into and out of contact with a material to which the toned image is transferred using an electric field and comprising the step of: applying a voltage between said first medium conductive layer and said platen conductive layer which creates an electric field therebetween that creates a force holding said first medium to said platen to assist in removing said first medium from said material after the transfer of said toned image to said material.

* * * * *